Patented Feb. 14, 1950

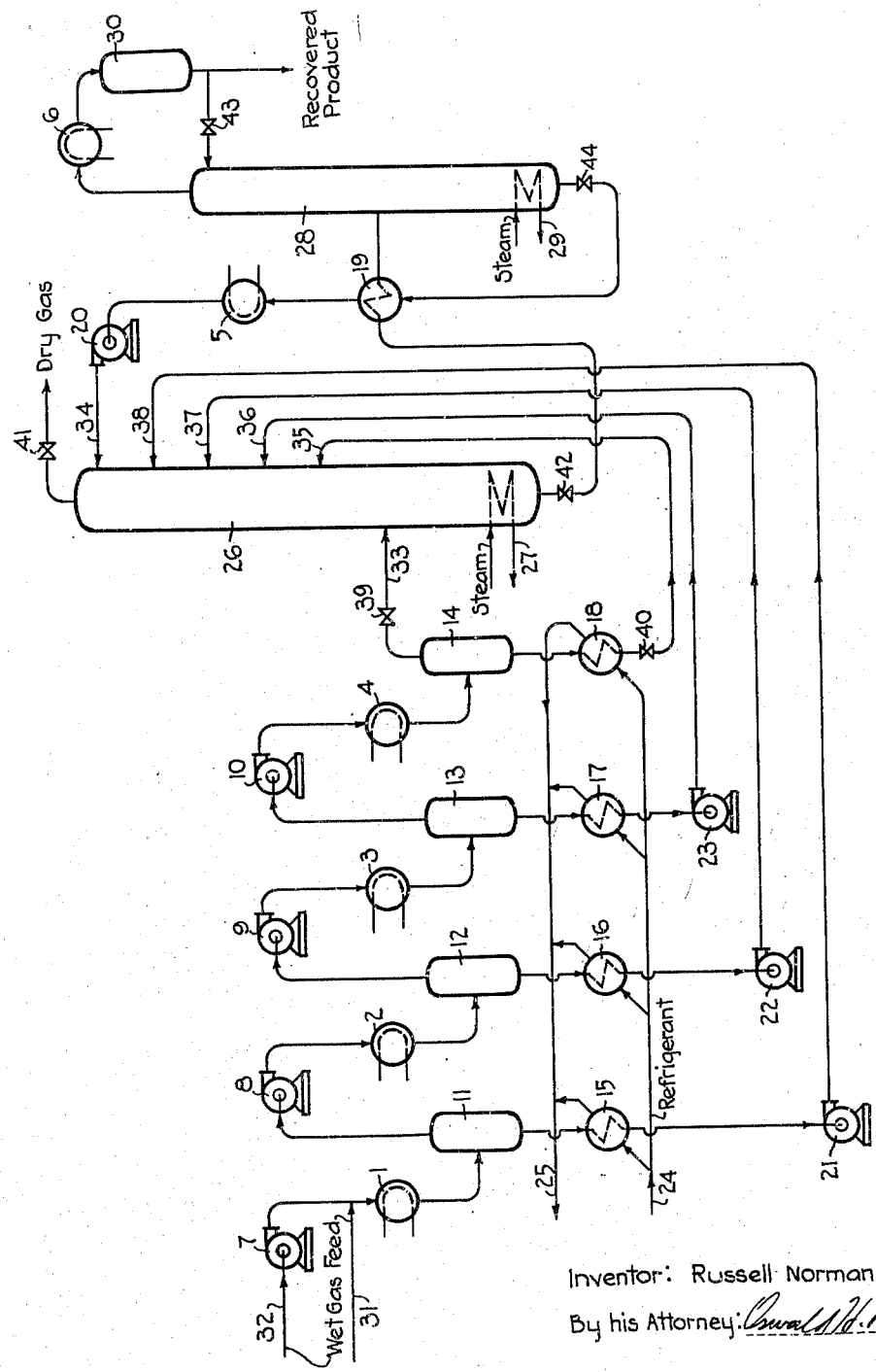

2,497,421

UNITED STATES PATENT OFFICE 2,497,421

ABSORPTION PROCESS

Russell N. Shiras, Oakland, Calif., assignor to Shell Development Company, San Francisco, Calif., a corporation of Delaware Application November 4, 1946, Serial No. 707,748

7 Claims. (Cl. 183—115)

This invention relates to improvements in the art of absorbing volatile hydrocarbons from mixed gases containing them, commonly known as absorption processes. In such process the mixed gas is contacted under pressure with an absorbing oil with the result that certain constituents of the mixture are absorbed in the oil. The absorbed constituents are usually the least volatile constituents contained in the gas mixture, as, for example, normally liquid hydrocarbons suitable for use as motor fuel, or more volatile hydrocarbons, such as butane and propane, depending upon the nature of the mixed gas being fed into the process.

The efficiency of the absorption process depends upon several factors, among which are the pressure, temperature, the rate of flow of absorbing oil to mixed gas, and the thoroughness with which the absorbing oil and gas are brought into contact. To achieve a sharper separation of the gas mixture into its constituents it is common to effect the process in columns wherein the absorbing oil and the gas are contacted countercurrently in a plurality of plates or equivalent stages, and the composition of the absorbed constituents and those in the gas phase in equilibrium therewith vary at different points in the column.

In the production of gaseous unsaturates, in particular acetylene and ethylene, by pyrolysis of hydrocarbons or hydrocarbon mixtures, increased yields of the desired unsaturates and decreased production of methane and coke are attained by a reduction of the pyrolysis pressure. For this reason commercial catalytic cracking plants, stoves, and high temperature continuous furnaces operate at substantially atmospheric pressure. On the other hand, the optimum pressure for absorption plants to recover these gaseous unsaturates from the gas mixtures resulting from the pyrolysis is comparatively high, pressures between 250 and 500 lbs./sq. in. being in many cases desirable. This necessitates mechanical compression of the gas between the furnace and the absorption tower, and this compression is best effected in two or three stages.

The present invention is particularly concerned with absorption processes requiring such preliminary compression, but may be applied also to other types of gas mixtures occurring initially at atmospheric pressures or at pressures which are below that, and/or temperatures which are above that, which is to be used in the absorption zone. Since absorption processes operate best at high pressures and low temperatures, it is necessary to subject such initial low pressure mixed gas to compression and cooling. During this preliminary handling of the feed gas part of the gas mixture is frequently condensed as a liquid, and either withdrawn as a separate product or introduced into the absorption zone, together with the uncondensed gas. Sometimes the condensed liquid is fed separately into the absorption zone for convenience in pumping, but it is nevertheless treated as a part of the mixed gas fed into the absorption zone.

It is an object of this invention to provide an improved absorption process wherein the efficiency of the absorption is improved by taking advantage of the difference in the composition between the liquid condensed from the initial gas mixture during the preliminary cooling and/or compression step, and the composition of the uncondensed gas. It is a further object to reduce the amount of absorption oil required to attain a given degree or sharpness of separation, and/or to improve the degree or sharpness of separation effected in the absorption process.

Another object of the invention is to provide an absorption process wherein the condensate separated from the initial mixed gas prior to its introduction into the absorption zone is utilized as an absorption oil, supplementing the main stream of absorption oil.

According to the present invention it was found that the efficiency of the absorption is improved by introducing the aforesaid condensed liquid into the absorption zone separately at an intermediate point of the absorption zone. When the compression and cooling is effected in several stages a series of condensates of progressively greater volatility is separated; in such a case the condensates may be combined and fed into the absorption zones as described above, but it was found that greater efficiencies are obtained by feeding the condensates separately at different points in such a manner that the most volatile condensate is introduced at a point nearest the point of introduction of the uncondensed gas.

The invention will be better understood from the following detailed description, taken together with the drawing, the single figure of which is a schematic flow diagram illustrating a preferred embodiment thereof.

In the drawings, 1, 2, 3, 4, 5 and 6 are coolers, such as water-cooled heat exchangers, suitable for cooling compressed gas or liquid; 7, 8, 9 and 10 are gas compressors; 11, 12, 13 and 14 are separators, wherein liquid condensate may be separated from gas; 15, 16, 17, 18 and 19 are heat exchangers; and 20, 21, 22 and 23 are liquid feed pumps. The heat exchangers 15 to 18, inclusive, are optional in some processes, but it was found advantageous to provide them to cool the oil flowing through them to temperatures below those readily obtainable with water. For this purpose a refrigerant, such as brine, is fed through line 24, waste refrigerant being drawn off at 25. 26 is an absorption column, provided with a stabilizing zone and steam coil 27 in the lower part; the upper portion of this column (above inlet 33) constitutes the absorption zone. 28 is a fractional distillation column, with a steam coil 29 and accumulator 30 for condensate.

The initial mixed gas, commonly known as "wet gas," is introduced at 31 at atmospheric or relatively low pressure. It may be petroleum gas from a gas or condensate well, or casing head gas or cracked gas, or any other gaseous mixture containing constituents which it is desired to recover. The initial gas is cooled in the first cooler 1, resulting in the formation of a first liquid condensate, which is separated from the uncondensed gas in the separator 11. In cases in which the initial gas mixture is not sufficiently near its dew point to form an appreciable condensate by means of the water cooler 1, the gas mixture may be introduced into the process at 32 and subjected to a preliminary compression at 7.

The embodiment of the invention illustrated utilizes three gas compression stages following the separator 11. The gas is withdrawn from the top of this separator and is successively compressed, cooled, and freed from the resulting condensate in each of these stages, the first stage comprising the compressor 8, cooler 2 and separator 12; the second stage the compressor 9, cooler 3, and separator 13; and the third stage the compressor 10, cooler 4, and separator 14. The final uncondensed gas from the top of the last separator is introduced at 33 into the bottom of the absorption zone of the absorption column 26, at the desired pressure. Operating conditions in absorption columns depend upon many variables such as the nature and volatility of the gas mixture, the constituent to be recovered and the pressures which can be attained by the equipment, and are generally understood in the art. In many cases the pressure is from 250 to 500 lbs./sq. in. and the temperature between 40° and 110° F., but my invention is not restricted to these conditions. Lean absorption oil, which may be any refined petroleum oil having a lower volatility than the constituent of the uncondensed gas mixture which is to be substantially recovered, is fed into the top of the column at 34. The absorption oil may also be of lower volatility than any of the constituents of the initial mixed gas. It is usually of light naphtha or second-cut gasoline boiling range, e. g. 200°–400° F.

The condensates separated in and withdrawn from the bottoms of the separators 11 to 14, inclusive, have progressively greater volatilities. These condensates are optionally further cooled in the heat exchangers 15 to 18, inclusive, and introduced into the absorption zone at points intermediate to the inlets 33 and 34. Preferably, the first (least volatile) condensate is introduced at a point near the top of the absorption zone, at 38, and the second, third and fourth condensates are introduced at progressively lower levels, indicated at 37, 36 and 35, respectively. Rates of introduction of materials into the column 26 are regulated by valves 39 and 40 and by feed pumps 20 to 23, inclusive, the pumps 21 to 23, inclusive, and the valve 40 being, in turn, controlled by the level in the separators by conventional liquid level controllers, not shown.

As the lean absorption oil travels downward in the absorption zone it selectively absorbs the less volatile constituents of the gas which travels upwardly. Dry gas is withdrawn at the top through valve 41. In its downward flow the absorption oil is also commingled with the condensates introduced at the intermediate points of the column. These condensates are, to a great extent, commingled in and supplement and absorption oil, but are vaporized to a certain extent, to approach an equilibrium between the co-existing liquid and vapor phases. It was found that by introducing these condensates in the manner described above, this equilibrium is established more readily and the gradient of vapor and liquid compositions between the ends of the absorption zone are smoother than would be the case if they were introduced at a single point, or if points of introduction of the condensates were interchanged.

Apart from the advantage of introducing the condensates at the several levels indicated, certain other advantages are to be realized even when a single condensate or a mixture of condensates is introduced at an intermediate point: the condensate augments the stream of absorption oil for substantially the same degree or sharpness of fractionation. Thus, the amount of desirable constituents of the gas reaching the upper part of the absorption zone is dependent upon the quantity of solvent or absorption oil in the lower part of this zone. Since the liquid condensate is less volatile than the gas fed in at 33, a substantial part of it will travel downwardly, and it may safely be introduced at a higher level. The small quantity of desirable constituent introduced at such higher level with the condensate can be readily absorbed by the lean absorption oil introduced at 34, which is still comparatively free from dissolved constituents.

Finally, the introduction of one or several side streams facilitates control of the absorption temperature. It is known that the absorption is usually exothermic, and that the lean oil becomes heated upon being brought into contact with the gas. By regulating the flow of refrigerant to the heat exchangers 15 to 18, inclusive, cold liquid can be injected into the absorption zone to counteract such heating. For this purpose, the condensates are advantageously cooled to temperatures below those which it is desired to maintain at the respective trays or levels at which the condensates are introduced.

The liquid flowing downwardly at the level of the inlet 33 is known as fat absorption oil and contains in solution practically all of the desirable constituents of the gas, together with some more volatile, undesirable gas. To remove the latter, the fat absorption oil is conducted through a stabilizing zone, at the bottom of which is a reboiler capable of supplying enough heat to vaporize substantially all of the normally gaseous undesirable constituents, and some of the desirable constituents. Heat is supplied through the steam coil 27. The vapors produced in this manner are allowed to rise in countercurrent to the fat absorption oil, gradually stabilizing the latter on its way down, and to join the gas introduced at 33. The fat absorption oil, when reaching the bottom of the stabilizing zone, is fully stabilized and is withdrawn from the column through a valve 42, further heated by flow through the heat exchanger 19, and introduced into the fractional distilling column 28.

In the column 28 the desired, recovered constituents are vaporized by means of heat supplied by steam coil 29 and dephlegmated in the upper part of the column. Vapors are condensed in cooler 6 and collected in accumulator 30, a portion of the condensate being returned to the column as reflux through the valve 43. Lean absorption oil is drawn off at the bottom of the column through valve 44, cooled in heat exchanger 19 and cooler 5, and introduced into the absorption zone by means of feed pump 20.

I claim as my invention:

1. The process of absorbing desirable volatile hydrocarbons from mixed gases containing such hydrocarbons, which comprises forming and separating from an initial mixed gas a liquid condensate, contacting the uncondensed gas countercurrently with an absorption oil of lower volatility than the constituents of said mixed gas in an absorption zone, and introducing the said separated condensate into said absorption zone at a point intermediate to the points of introduction of the uncondensed gas and the absorption oil so as to flow countercurrently to the uncondensed gas.

2. The process according to claim 1 in which the liquid condensate is formed by cooling the initial mixed gas.

3. The process according to claim 1 in which the liquid condensate is formed by compressing the initial mixed gas.

4. The process according to claim 1 in which the liquid condensate, after separation from the gas and prior to its introduction into the absorption zone, is cooled to a temperature below that of the absorption zone at the point of introduction of the condensate.

5. The process of absorbing desirable volatile hydrocarbons from mixed gases containing such hydrocarbons, which comprises alternately compressing and cooling an initial mixed gas in several stages, separating from the uncondensed gas in at least two stages a liquid condensate formed as a result of said compression and cooling which is in equilibrium with the uncondensed gas in the respective stages, contacting the uncondensed compressed gas countercurrently with an absorption oil of lower volatility than the constituents of said uncondensed gas in an absorption zone, and introducing the separated liquid condensates separately into said absorption zone at different points intermediate to the points of introduction of the uncondensed gas and absorption oil so as to flow countercurrently to the uncondensed gas, the condensate of greater volatility being introduced at the point nearer the point of introduction of the uncondensed gas than the point of introduction of a condensate of lower volatility.

6. The process according to claim 5 in which the liquid condensates are cooled to temperatures below those of the absorption column at the points of introduction.

7. The process of absorbing desirable volatile hydrocarbons from mixed gases containing such hydrocarbons, which comprises flowing an initial mixed gas successively through a plurality of stages, each stage comprising a compression step, a cooling step, and a separating step, separating in each separating step a liquid condensate formed as a result of said compression and cooling, introducing the uncondensed gas from the final stage near one end of an absorption zone, introducing lean absorption oil of lower volatility near the other end of said absorption zone, counter-flowing said gas and absorption oil within said absorption zone, cooling each of the separated liquid condensates, and separately introducing the resulting cooled liquid condensates at different points spaced along the absorption zone intermediate to said points of introduction of the gas and lean absorption oil, the points of introduction of the cooled liquid condensates being in the same sequence as the sequence in which they were formed and the point of introduction of the condensate from the first stage being nearest the point of introduction of the lean absorption oil.

RUSSELL N. SHIRAS.

REFERENCES CITED

The following references are of record in the file of this patent:

UNITED STATES PATENTS

| Number | Name | Date |
| --- | --- | --- |
| 1,917,899 | Parks | July 11, 1933 |
| 1,946,580 | Gregory | Feb. 13, 1934 |
| 1,976,212 | Brewster | Oct. 9, 1934 |
| 2,243,315 | Kramer | May 27, 1941 |
| 2,250,949 | Gerlach | July 29, 1941 |
| 2,273,412 | McCullough | Feb. 17, 1942 |
| 2,337,254 | Legatski | Dec. 21, 1943 |